United States Patent [19]

Moen

[11] 4,000,857
[45] Jan. 4, 1977

[54] FLOW CONTROL AERATOR

[76] Inventor: Alfred M. Moen, 25 Lakeview Drive, Grafton, Ohio 44044

[22] Filed: June 30, 1975

[21] Appl. No.: 591,635

Related U.S. Application Data

[63] Continuation of Ser. No. 489,234, July 17, 1974, abandoned.

[52] U.S. Cl. .................. 239/428.5; 137/860; 138/46; 239/533.14; 239/572; 239/575
[51] Int. Cl.² ................ B05B 1/30; F16K 15/08
[58] Field of Search ........... 239/428.5, 452–454, 239/519, 534, 535, 570–572, 575; 137/498, 504, 505.14, 505.15, 525, 525.1; 138/43, 45, 46

[56] References Cited

UNITED STATES PATENTS

| | | | |
|---|---|---|---|
| 2,614,793 | 10/1952 | Storm | 137/525 |
| 2,820,569 | 1/1958 | Peterson | 137/525 X |
| 2,939,487 | 6/1960 | Fraser et al. | 239/452 X |
| 3,010,659 | 11/1961 | Goodrie et al. | 239/428.5 |
| 3,014,667 | 12/1961 | McLean et al. | 239/428.5 |
| 3,216,451 | 11/1965 | Smallpiece | 137/525 X |
| 3,298,394 | 1/1967 | Chorkey | 137/525 |
| 3,630,444 | 12/1971 | Nelson | 239/534 X |
| 3,630,455 | 12/1971 | Parkison | 239/535 |
| 3,697,002 | 10/1972 | Parkison | 239/535 |
| 3,847,178 | 11/1974 | Keppel | 138/46 X |

FOREIGN PATENTS OR APPLICATIONS

| | | | |
|---|---|---|---|
| 1,181,015 | 11/1964 | Germany | 239/572 |

Primary Examiner—Robert S. Ward, Jr.
Attorney, Agent, or Firm—Kinzer, Plyer, Dorn & McEachran

[57] ABSTRACT

A flow control device that maintains a constant flow rate and is arranged to produce a regulated, aerated stream on the discharge side.

18 Claims, 19 Drawing Figures

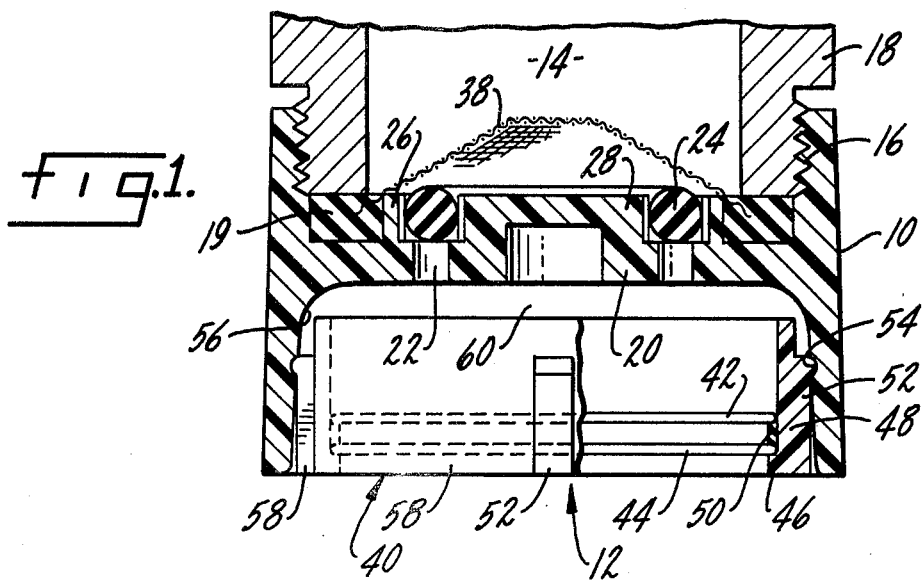
fig.1.
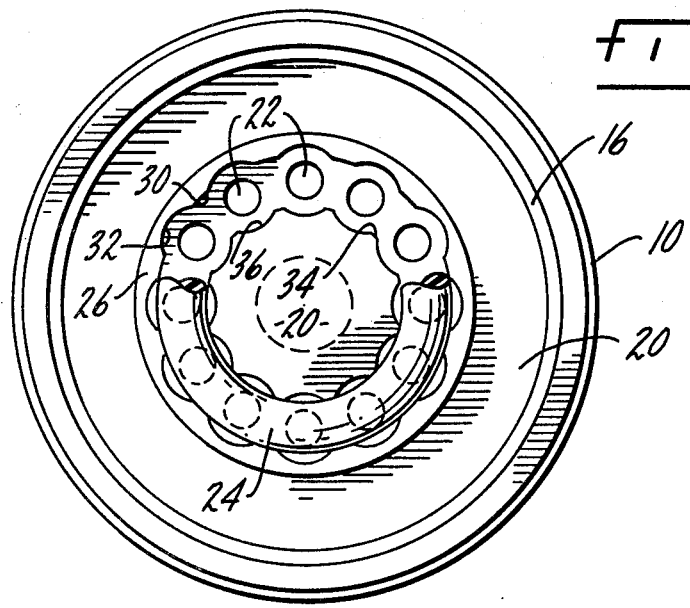
fig.2.
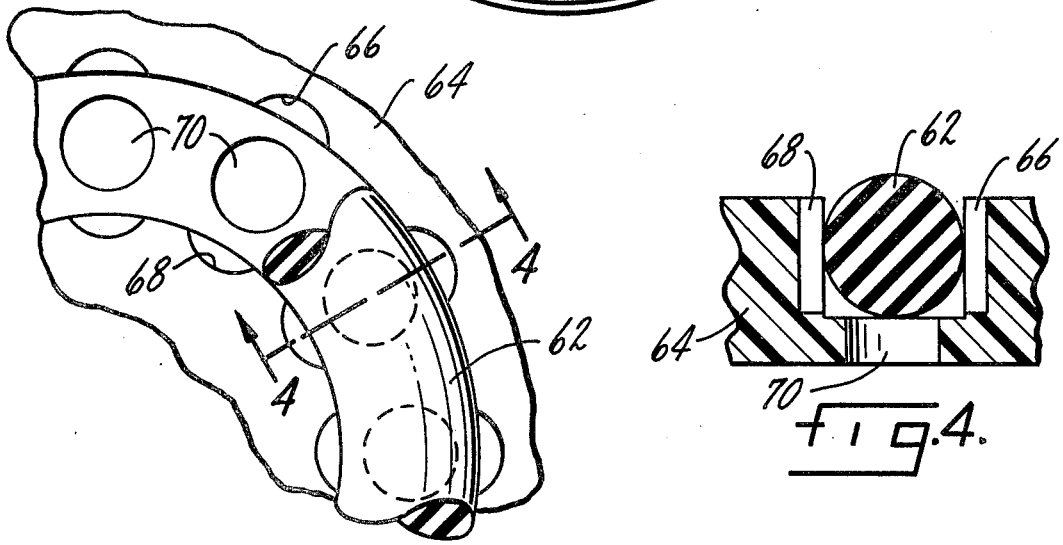
fig.3.
fig.4.

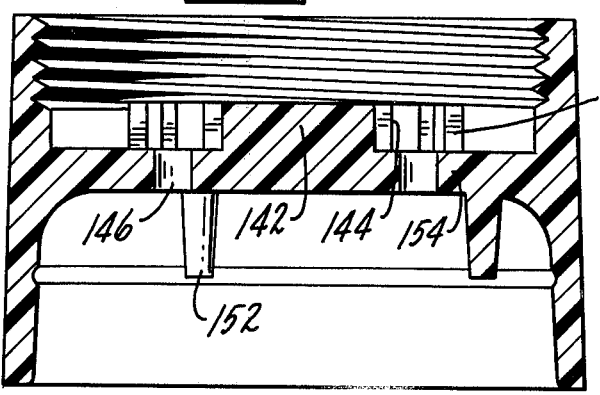
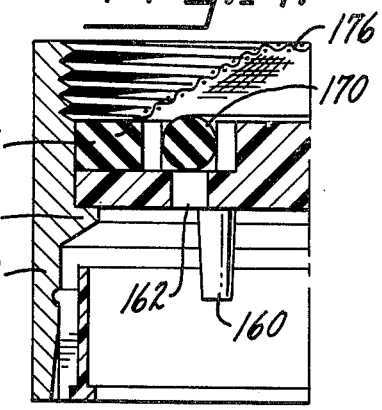
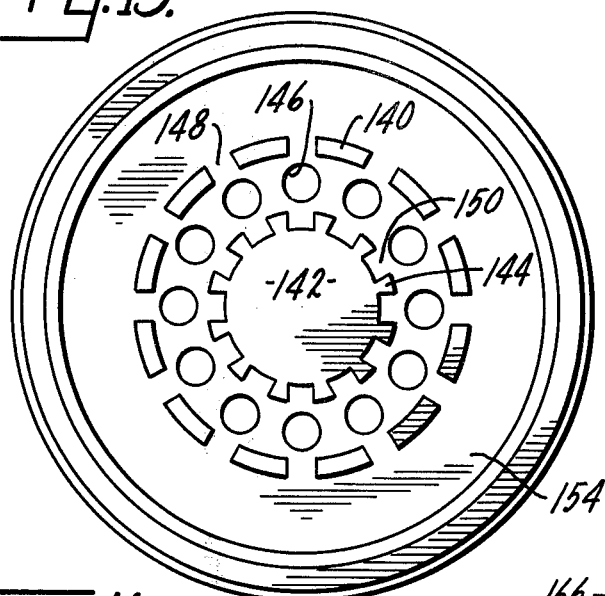
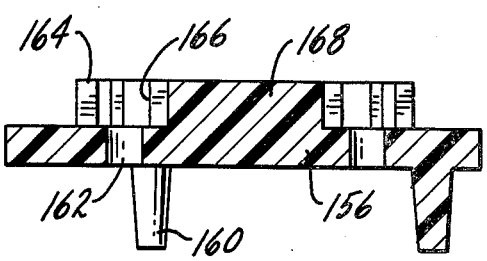
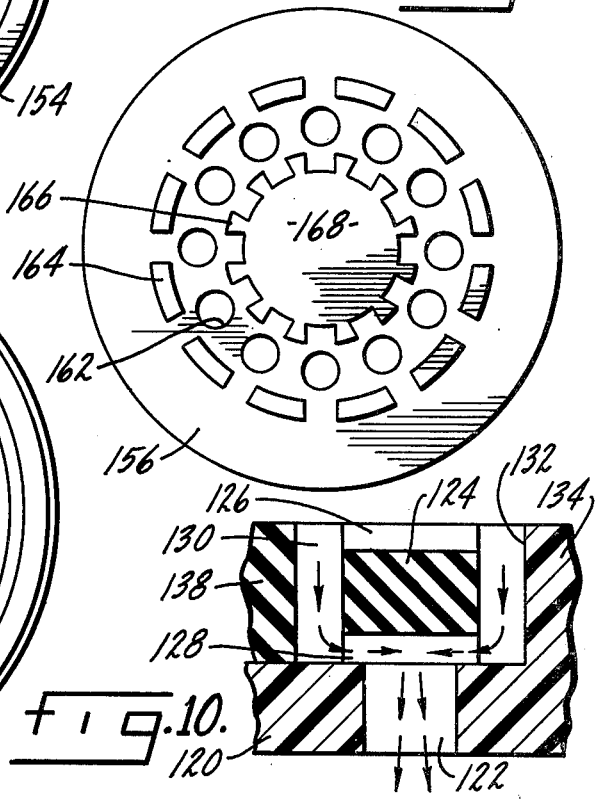
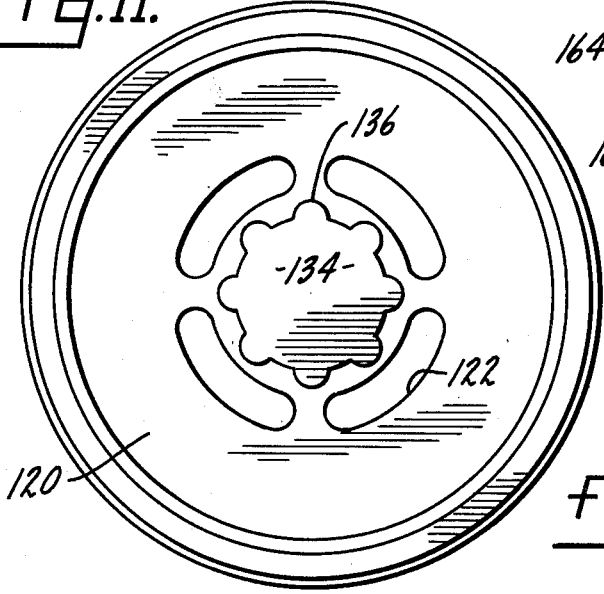

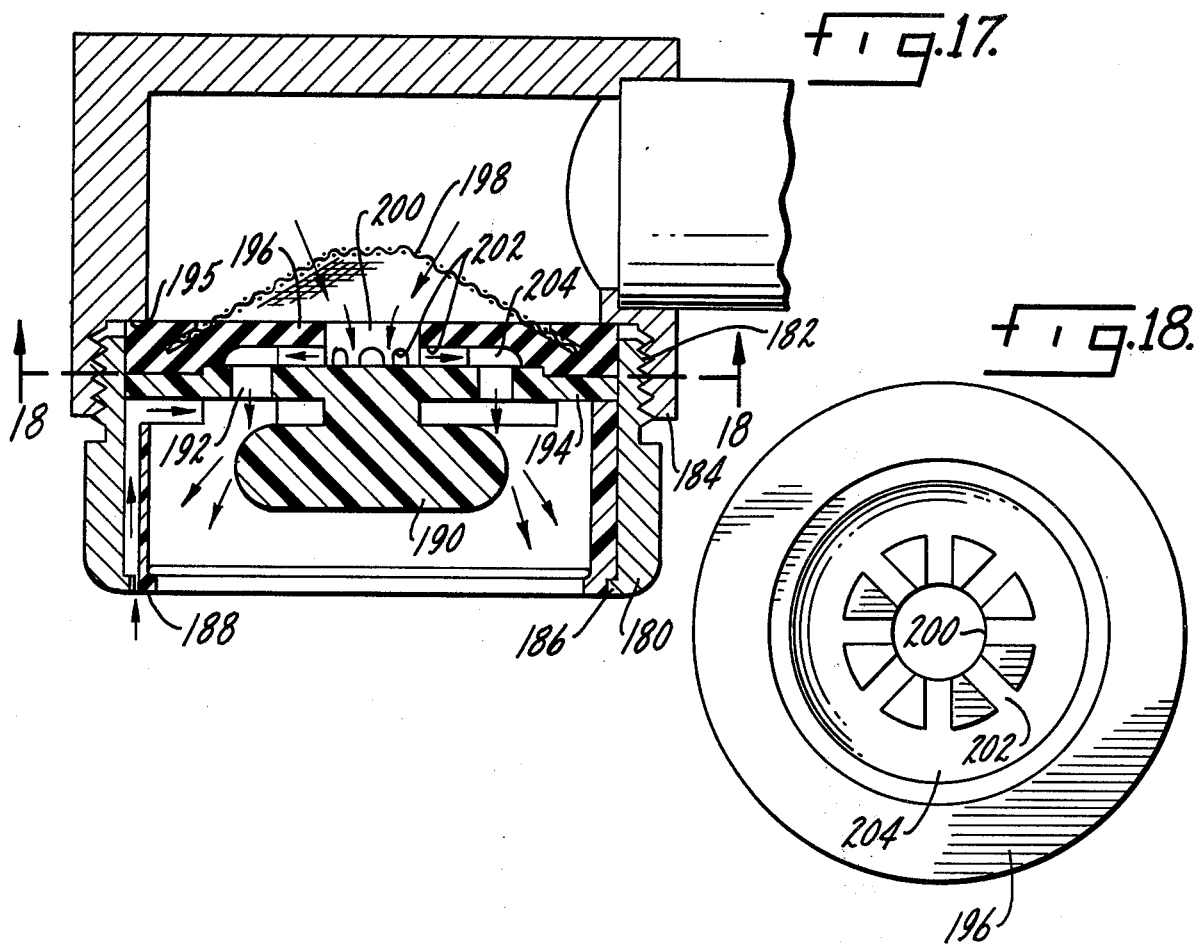
Fig. 17.
Fig. 18.
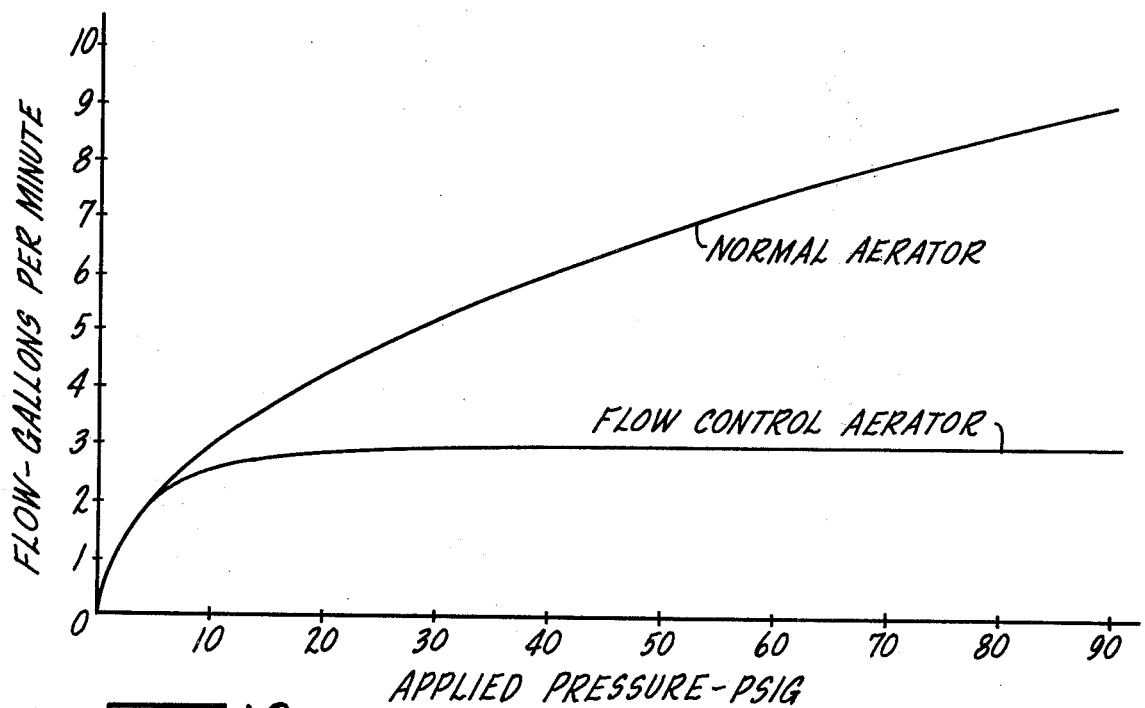
Fig. 19.

FLOW CONTROL AERATOR

This is a continuation, of application Ser. No. 489,234, filed July 17, 1974 and now abandoned.

SUMMARY OF THE INVENTION

The present invention relates to aerators of the type commonly used with kitchen and bathroom faucets and particularly relates to such aerators in which a distortable flow control member responds to pressure within the aerator to regulate the volume of water passing through the aerator.

A primary purpose of the invention is an aerator of the type described using an annular ring as the pressure-responsive flow control member.

Another purpose is an aerator of the type described in which the pressure-responsive flow control member tends to reduce entrances into partition passages as the pressure of water admitted to the aerator increases.

Another purpose is a flow control aerator utilizing a partition extending across the path of flow of water through the aerator, a plurality of passages through the partition and a flow control pressure-responsive member associated with said passages.

Another purpose is an aerator of the type described in which the passages through the partition are concentrically arranged with an annular flow control member in the path of water flow through the aerator.

Another purpose of the invention is an aerator providing optimum mix of air and water for best aeration at all pressures.

Other purposes will appear in the ensuing specification, drawings and claims.

BRIEF DESCRIPTION OF THE DRAWINGS

The invention is illustrated diagrammatically in the following drawings wherein:

FIG. 1 is a vertical section through an aerator of the type described,

FIG. 2 is a top plan view of the aerator,

FIG. 3 is a partial top plan view of a modified form of aerator,

FIG. 4 is a section along plane 4—4 of FIG. 3,

FIG. 10 is a partial vertical section through a modified form of aerator, FIG. 11 is a top plan view of the aerator of FIG. 10, FIG. 12 is a vertical section through a further form of aerator, FIG. 13 is a top plan view of the aerator of FIG. 12, FIG. 14 is a partial vertical section through a further form of aerator, FIG. 15 is a side elevation of the partition means of FIG. 14, FIG. 16 is a top plan view of the partition of FIG. 14, FIG. 17 is a partial vertical section through yet a further form of modified aerator, FIG. 18 is a section along plane 18—18 of FIG. 17, and FIG. 19 is a flow control diagram.

DESCRIPTION OF THE PREFERRED EMBODIMENT

Figure 5:
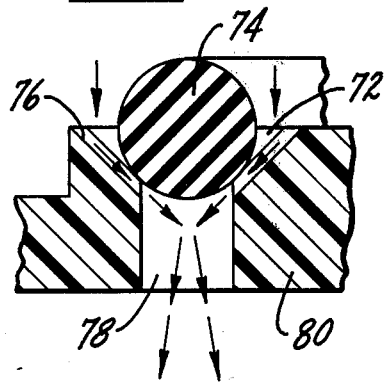
FIG. 5 is a partial vertical section through a modified form of aerator.

The present invention relates to aerators of the type having an upstream jet forming means which breaks the flowing stream of water into a large number of individual jets and downstream screen means which completes the aerating process. There are air passages in communication with the space between the jet forming means and the screen means so that streams of water leaving the jet forming means mix with air prior to reaching the screen means, where the aerating process is completed. The air passage means may either extend from beneath the aerator, outside of the screen means, or there may be openings within the aerator housing which admit air downstream of the jet forming means. The present invention is particularly concerned with a flow control member which is positioned upstream of the jet forming means and which controls or regulates the flow of water through the jet forming means in response to pressure of water flowing into the aerator.

In FIG. 1, an aerator housing is indicated at 10 and includes an outlet or discharge 12 and an inlet end 14. There are threads 16 at the upstream end of the housing 10 for use in attaching the aerator to a typical spout 18. A seal 19 is positioned between the housing 10 and spout 18. The aerator housing 10 may conveniently be formed of a suitable metal, such as brass or the like. However, the most economic means for forming aerators is to use a suitable plastic and either plate the external areas of the housing or not, depending upon the desired cost of the aerator and its particular use.

The housing 10 may have an integral partition 20, which functions as the jet forming means described above. There are a plurality of individual passages 22 in partition 20, arranged in an annular manner, concentric with the axis of the housing 10. Positioned on the upstream side of the partition 20 and at least partially masking the passages 22, is a pressure-responsive flow control member 24 which, as shown in FIGS. 1 and 2, may be an O-ring formed of a suitable elastomeric or rubberlike material. The ring 24 is supported and maintained in the position of FIG. 1 by inner and outer walls 26 and 28 which extend upwardly from the upstream side of the partition 20. As particularly shown in FIG. 2, the outer wall 26 is generally in thickness, except for areas adjacent the passages 22. The inner surface 30 of the outer wall 26 is outwardly curved, as at 32, to provide access to the passages 22. In like manner, the outer surface 34 of inner wall 28 is inwardly curved, as at 36, to provide access to the opposite side of each passage 22. Thus, water flowing from the faucet spout, first passing through a conical screen 38, will reach the flow control member 24, will flow downwardly past it, both on the inside and the outside, to reach the water passages 22 in the partition 20. The screen 38 may have its outer edges embedded in seal 19.

Downstream of the partition 20 is a screen means or screen device indicated generally at 40 and including a pair of spaced screens 42 and 44. The lower screen 44 is positioned on a ledge 46 extending inwardly from screen support 48. The upper screen 42 is positioned upon a circular spacer 50 on the inside surface of the screen support 48. Thus, the screens 42 and 44 are held in spaced relation in a conventional manner within the screen support 48.

The screen support 48 in turn is positioned within the lower or downstream end of the housing 10 by a plurality, for example four, outwardly extending projections 52 which snap within a mating groove 54 on the inside surface 56 of the housing 10. The projections 52 may be circumferentially spaced, one from another, to define upwardly-extending air passages 58. Air is drawn from the area outside the bottom of the aerator, upwardly along the passages 58 and then to the space 60 at the downstream side of the jet forming member or partition 20 and above the screen means 40.

In operation, water flowing from the spout will first pass through the conical screen 38 and then through the entrances defined by curved sections 32 and 36 into the water passages 22. After passing through jet forming passages 22, the streams of water will mix with air from passages 58 and then flow through the screen means 40 to provide the conventional aerated discharge. The pressure-responsive flow control member 24 is formed of a distortable material. Thus, the greater the fluid pressure applied from the spout 18, the greater will be the distortion of the member 24 to restrict the entrances into the water passages 22. Thus, the amount of water that will flow through the aerator is limited by the pressure-responsive flow control member, even though the pressure applied to the aerator may continually increase. There is a maximum amount of water that can be discharged from the aerator, regardless of the pressure applied to it. This has particular advantage both as far as the saving of water, one of our important natural resources, and as far as permitting the user of the faucet to control the total amount of water supplied by the spout. It is not unusual for someone operating a kitchen or bathroom faucet to first turn the faucet to full "on". With the current aerator designs, this often provides more water than necessary or needed and at times will splash the user. With a flow control device of the disclosed type, the maximum amount of water that can be supplied by the faucet is clearly limited to a useful range.

In the device of FIGS. 3 and 4, the flow control member 62 may be recessed at least partially within partition 64. There are outer and inner grooves 66 and 68, which may be arcuate or otherwise, adjacent each of the passages 70 in the partition member so as to provide entrances into the water passage.

In the structure of FIG. 5 there is a V-shaped annular groove 72 which is used to position and support the annular pressure-responsive flow control member 74. Water from the upstream side of the aerator will pass through slanted entrances 76 from opposite sides of the flow control member to the axially-directed passage 78 in the partition 80. Note that the streams of water will meet and contact each other upstream of the bottom end of passage 78. The contacting of the water streams at this point serves to further break up the water jets prior to contact with air, and the screens at the discharge end of the aerator. Again, the flow control member 74 is at least partially within the partition 80 and is supported and positioned by the partition.

Figure 6:
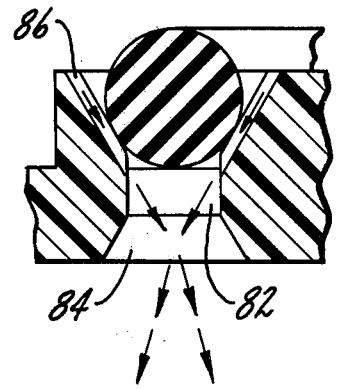
FIG. 6 is a partial vertical section through yet a further form of aerator.

In the structure of FIG. 6, substantially similar to FIG. 5, the principle difference is that the downstream end of the passage 82 has outwardly-flared sides 84 so that the streams of water passing through entrances 86 can further diverge from the directions shown in FIG. 5. Thus, the streams may contact each other, as clearly shown by the arrows in FIG. 6, but because of the outwardly-flared downstream sides of passages 82, there will be more dispersion of the individual streams after they have contacted one another.

Figure 7:
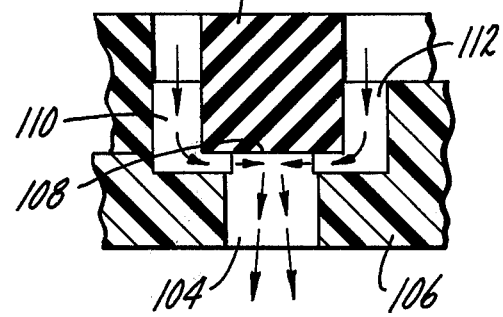
FIG. 7 is a partial vertical section through yet a further form of aerator.
Figure 8:
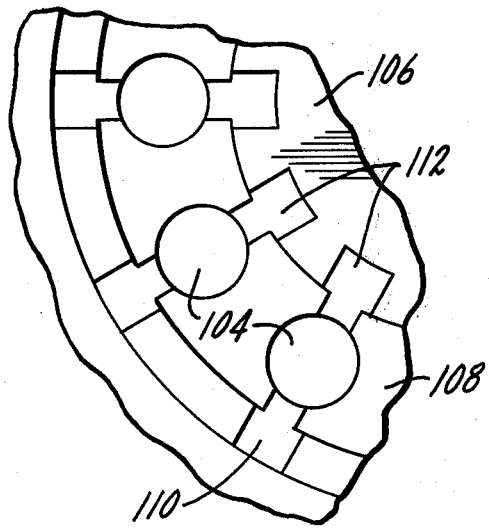
FIG. 8 is a partial top plan view of the aerator of FIG. 7.

In the structure of FIGS. 7 and 8, flow control member 102 is positioned over passage 104 and is spaced upwardly therefrom by a portion of the partition 106 indicated at 108. The entrances 110 and 112 are aligned with the axis of the circular passage 104, as particularly shown in FIG. 8. With such an arrangement there is an axially-directed flow pattern as water flows downwardly through passage 104.

Figure 9:
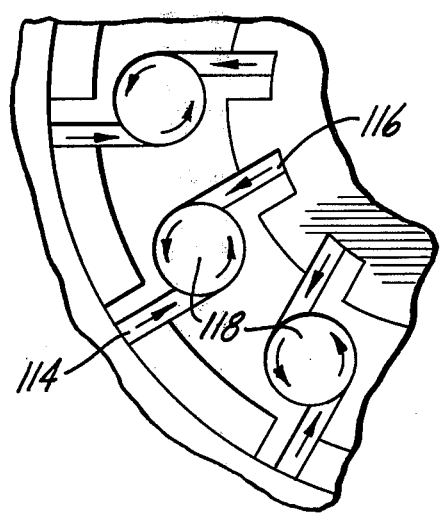
FIG. 9 is a partial top plan view of a modified form of the aerator shown in FIG. 7.

The structure of FIG. 9 is somewhat similar to that of FIG. 8, except in this case the entrances 114 and 116 of passage 118 are arranged tangentially to the circular passages 118, rather than axially, as in FIG. 8. Thus, the water will have a swirling motion instead of a more axially-directed flow pattern, as in FIG. 8.

In FIGS. 10 and 11, a partition 120 may have passages 122, each of which are masked by a pressure-responsive flow control member 124. The member 124 has upper and lower aligned slots 126 and 128 which permit water to flow through entrances 130 and 132 into passages 122. The flow control member is reversible in that the grooves or slots are aligned. As shown particularly in FIG. 11, the passages 122, rather than being a series of individual holes, as in the above forms of the invention, may be formed in the shape of arcuate slots. In the center of the partition means 120 there is an upstanding solid area 134 which has a series of spaced outwardly-extending projections 136 which are spacers for the pressure-responsive flow control member 124. As shown in FIG. 10, the outer confinement for the member 124 is seal ring 138.

In FIGS. 12 and 13, there are a series of spaced upstanding wall sections 140 which define the outer confining means for the pressure-responsive flow control member. The inner solid upstanding area 142 has a plurality of outwardly-extending projections 144 which cooperate with the wall sections 140 to properly align and position the flow control member relative to water passages 146. The openings 148 between each of the wall sections 140 cooperate with the wall sections to define the outer radially extending entrances into the passages 146 and in like manner spaces 150 between projections 144 define inner radial water entrances for passages 146.

In addition, as shown particularly in FIG. 12, there may be a plurality, for example three, downwardly-extending fingers 152 on the downstream side of the partition 154 to properly space and align the screen support structure, not shown in FIG. 12, which screen support structure may be the same as shown in FIGS. 1 and 2.

In FIGS. 14, 15 and 16, partition 156 is not integral with the housing, as in the other forms of the invention, but is separate from outer housing 158. In this case, the housing 158 may be metal, for example brass, and the partition 156 may be a suitable plastic. In other respects, the overall structure is similar to that shown in FIG. 12. The partition 156 may have downwardly-extending fingers 160 and may have a series of annularly arranged passages 162. There are upstanding wall sections 164, as in FIG. 13, which cooperate with outwardly-extending projections 166 from the central area 168 to form the positioning and support means for the pressure-responsive flow control member 170. The partition 156 rests upon a ledge 172 integral with the metal housing 158. A suitable seal ring 174, having a cone screen 176 embedded therein, may cooperate to position the partition 156.

In FIGS. 17 and 18, the aerator housing 180 may have external threads 182 for connection into a suitable spout structure 184 having internal threads. At the lower end of the housing 180 there may be an in-turned lip 186 which supports a suitable screen structure 188. Upstream from the screen support structure 188 there is a spray forming member 190, which may have a conventional rounded outer surface and which is effective to break up the streams of water flowing outwardly from passages 192 in the partition or diaphragm 194. Air will flow upwardly, outside of the screen support structure 188, into the mixing space surrounding spray forming member 190 where the air and water will mix before passing downwardly through the screens.

Positioned on the upstream side of the partition 194 is a pressure-responsive flow control member 196 which is generally co-extensive with the partition and is held in position between a ledge 195 on the housing 184 and the partition 194. The flow control member 196 may have an embedded cone screen 198 and has a central water passage 200. Water flows downwardly from the spout structure 184 into passage 200 and then flows radially toward the outside of member 196 through a series of radially-extending slots 202. The slots 202 terminate in an annular chamber 204 which is positioned directly above annularly-arranged water passages 192. Since the flow control member 196 is suitably formed of a rubberlike or elastomeric material, the pressure of the water above it will tend to close the radial slots 202 or restrict the sides of the chamber 204 and thus provide the described water flow control.

FIG. 19 is a diagram showing the restriction on flow provided by an aerator as described herein. The abscissa of the curve shows applied pressure, whereas, the orginate shows flow in gallons per minute. Note that with a flow control aerator, or an aerator formed in accordance with the present invention, there will be an increase in flow with an increase in applied pressure up to a maximum flow level. Any further increase in applied pressure will provide no further increase in flow, as the entrances into the passages in the diaphragm have been fully restricted by applied water pressure. This is in contrast to the curve showing operation of a normal aerator in which there is a continual increase in flow with an increase in applied pressure. As indicated above, it is the principal object of the present invention to restrict and control water flow to a predetermined level, regardless of what further increases in applied pressure may be available at the entrance to the aerator.

Whereas the preferred form of the invention has been shown and described herein, it should be realized that there may be many modifications, substitutions and alterations thereto.

The embodiment of the invention in which an exclusive property or privlege is claimed are defined as follows:

1. A water aerating device including a housing having a water inlet and outlet, screen means associated with said housing outlet, partition means in said housing positioned upstream of said screen means, air passage means in said housing in communication with the downstream side of said partition means, said partition means including a plurality of annularly arranged water passages extending therethrough, circumferential outer wall means integral with said partition means and extending upstream therefrom, circumferential inner wall means integral with said partition means and extending upstream therefrom, an annular flow control member formed of a distortable material positioned between and by said wall means and positioned to partially mask the upstream end of said partition means water passages, said annular member and wall means cooperating with each passage to form entrances thereto on opposite sides of said annular member.

2. The structure of claim 1 further characterized in that said annular member is a ring having a generally circular cross section.

3. The structure of claim 1 further characterized in that said annular member is a ring having a generally polygonal cross section.

4. The structure of claim 1 further characterized in that said annular member extends, at least in part, below the upstream side of said partition means.

5. The structure of claim 1 further characterized in that said distortable pressure-responsive flow member is caused to restrict said water passage entrances responsive to water flowing through said aerator housing from said aerator inlet.

6. The structure of claim 1 further characterized in that each of said water passages are circular in cross section, with each of said entrances being generally tangentially disposed relative to said passages so as to cause a swirling motion of water within each passage.

7. The structure of claim 1 further characterized in that the entrances into each water passage are slanted relative to the direction of flow through said aerator.

8. The structure of claim 1 further characterized in that said air passage means extend from the area outside of said housing outlet upstreamwardly, within the housing, and outside said screen means to an area downstream of said partition means.

9. The structure of claim 1 further characterized in that said housing and partition means are integrally formed of a non-metallic material.

10. The structure of claim 1 further characterized in that said housing and partition means are separate members formed of dissimilar materials.

11. The structure of claim 10 further characterized in that said housing is metallic and said partition means is nonmetallic.

12. The structure of claim 1 further characterized in that said pressure-responsive flow control means includes an annular member positioned upstream of said partition means and generally co-extensive with said partition means.

13. The structure of claim 12 further characterized by and including a screen embedded in said pressure-responsive flow control means and positioned upstream thereof.

14. The structure of claim 12 further characterized by and including a spray forming member depending from the downstream side of said partition means.

15. The structure of claim 12 further characterized in that said pressure-responsive flow control member has a central upstream opening and a plurality of radially extending passages.

16. The structure of claim 1 further characterized in that said outer wall means has a series of equally spaced axially extending grooves defining entrances to said passages on the outside of said annular member.

17. The structure of claim 1 further characterized in that said inner wall means has a series of equally spaced axially extending grooves defining entrances to said water passages on the inside of said annular member.

18. The structure of claim 17 further characterized in that said annular member is in contact with said inner wall means in the areas between said axially extending grooves.

* * * * *